(12) United States Patent
Raniwala

(10) Patent No.: US 9,665,526 B2
(45) Date of Patent: May 30, 2017

(54) IMPLEMENTING IO EXPANSION CARDS

(75) Inventor: Sundeep Raniwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 13/997,756

(22) PCT Filed: Dec. 15, 2011

(86) PCT No.: PCT/US2011/065150
§ 371 (c)(1),
(2), (4) Date: Mar. 31, 2014

(87) PCT Pub. No.: WO2013/089741
PCT Pub. Date: Jun. 20, 2013

(65) Prior Publication Data
US 2014/0229649 A1  Aug. 14, 2014

(51) Int. Cl.
*G06F 13/20* (2006.01)
*G06F 13/40* (2006.01)

(52) U.S. Cl.
CPC ...... *G06F 13/4081* (2013.01); *Y02B 60/1228* (2013.01); *Y02B 60/1235* (2013.01)

(58) Field of Classification Search
CPC .................................................. G06F 13/4081
USPC ........................................................ 710/313
See application file for complete search history.

(56) References Cited

U.S. PATENT DOCUMENTS

2004/0260853 A1  12/2004  Cho et al.
2005/0066073 A1   3/2005  Jacobs et al.
2006/0235999 A1*  10/2006  Shah ........................ H04L 49/90
                                                        710/1

FOREIGN PATENT DOCUMENTS

JP        2001-005574 A     1/2001
KR    10-2003-0053160 A     6/2003
TW           I243995 B     11/2005
WO       2013/089741 A1    6/2013

OTHER PUBLICATIONS

International Search Report and Written Opinion received for PCT application No. PCT/US2011/065150, mailed on Aug. 30, 2012, 9 pages.

(Continued)

*Primary Examiner* — Chun-Kuan Lee
(74) *Attorney, Agent, or Firm* — Jordan IP Law, LLC

(57) ABSTRACT

Methods and systems may provide for an expansion card including one or more peripheral ports, a connection edge having a first bus interface and a second bus interface, and an input output (IO) controller coupled to the first bus interface and at least one of the one or more peripheral ports. The expansion card can also include an embedded controller coupled to the IO controller and the second bus interface, wherein the embedded controller has logic to receive a general purpose input output (GPIO) signal from the IO controller. The logic may also notify an off-card host device of the GPIO signal via the second bus interface. In one example, the IO controller is a Thunderbolt controller, the first bus is a PCI-e bus, and the second bus is an SMBus.

25 Claims, 2 Drawing Sheets

(56) References Cited

OTHER PUBLICATIONS

International Preliminary Report on Patentability and Written Opinion received for PCT Patent Application No. PCT/US2011/065150, mailed on Jun. 26, 2014, 6 pages.

Notice of Allowance for Taiwanese Patent Application No. 101147510, mailed Oct. 20, 2016, 4 pages including 1 page of English translation.

\* cited by examiner

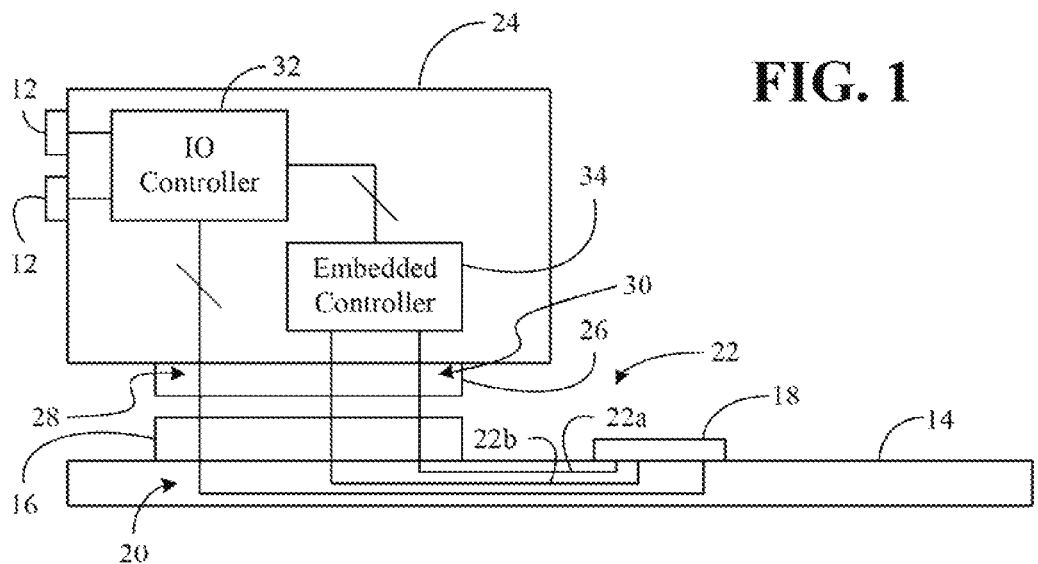
FIG. 1
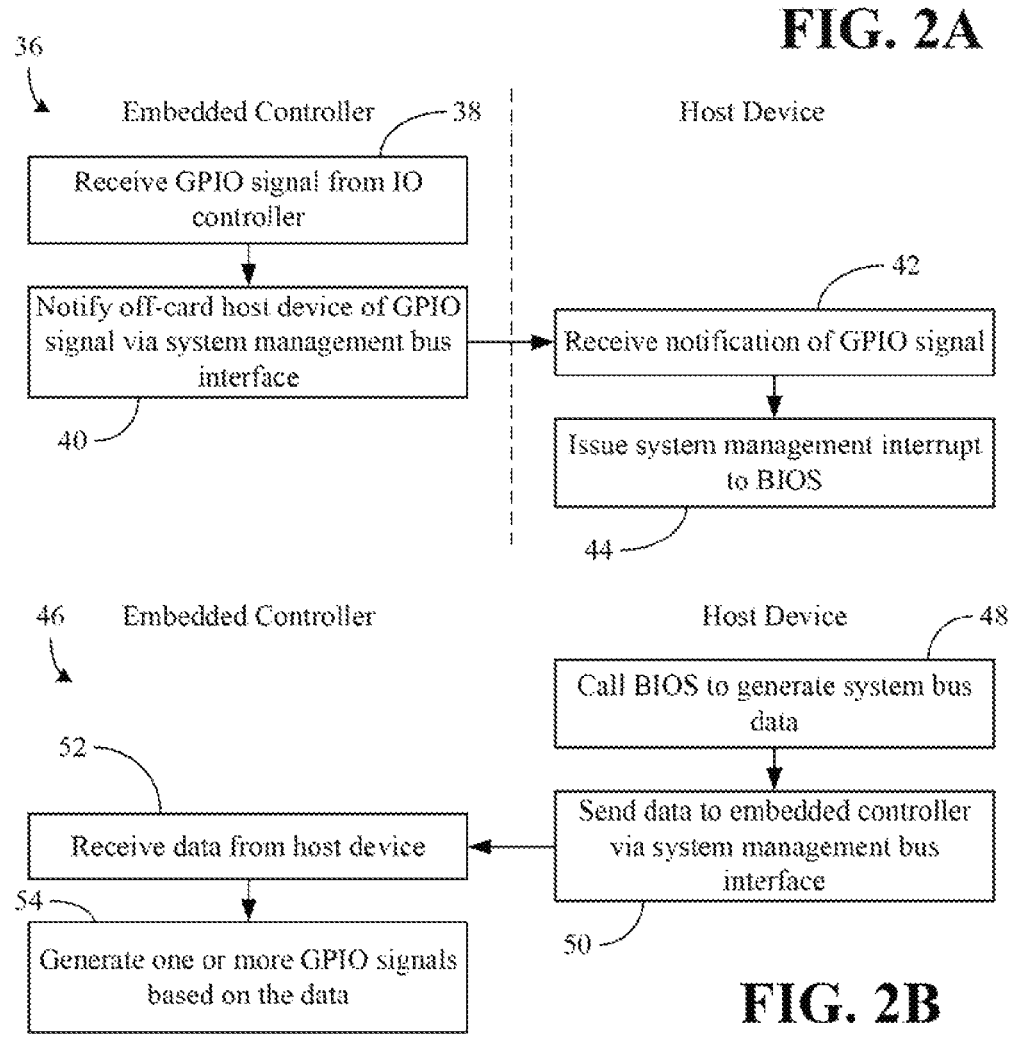
FIG. 2A
FIG. 2B

IMPLEMENTING IO EXPANSION CARDS

BACKGROUND

Technical Field

Embodiments generally relate to input output (IO) interfaces. More particularly, embodiments relate to the implementation of IO interfaces on expansion cards.

Discussion

Computing systems may include one or more external ports to support IO communication with peripheral components such as keyboards, mice, cameras, and so forth, wherein certain IO controllers may be soldered to the main system board (e.g., in a "down device" architecture) to support the communication. Such an approach may add to the overall cost of the system, even if the end user does not have a use for the IO controller in question. Moreover, connectivity to certain peripheral devices might require the purchase of a new computing system that has the IO controller built-in.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a side view of an example of a computing system according to an embodiment;

FIG. 2A is a flowchart of an example of a method of transferring information from an expansion card IO controller to a host device according to an embodiment;

FIG. 2B is a flowchart of an example of as method of transferring information from a host device, to an expansion card IO controller according to an embodiment.

DETAILED DESCRIPTION

Figure 3:
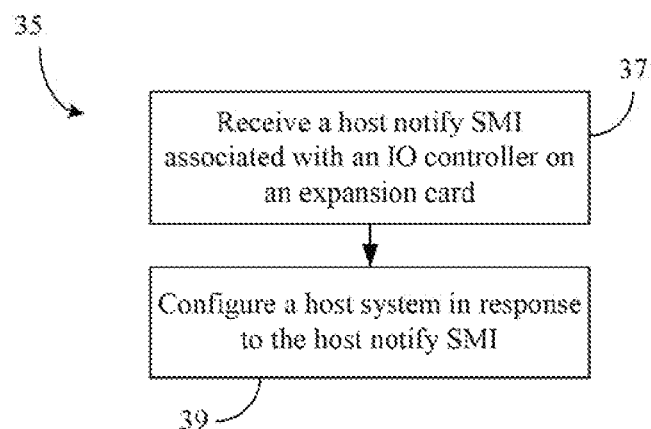
FIG. 3 is a flowchart of an example of a basic input output system (BIOS) process according to an embodiment.

Embodiments may include a computer readable storage medium having a set of instructions which, if executed by a processor, cause a system to receive a general purpose input output (GPIO) signal from an IO controller of an expansion card. The instructions may also cause a system to notify an off-card host device of the GPIO signal via a system management bus interface of the expansion card.

Embodiments may also include an expansion card having one or more peripheral ports, and a connection edge with a first bus interface and a second bus interface. The expansion card can also have an IO controller coupled to the first bus interface and at least one of the one or more peripheral ports, and an embedded controller coupled to the IO controller and the second bus interface. The embedded controller may include logic to receive a GPIO signal from the IO controller, and notify an off-card host device of the GPIO signal via the second bus, wherein the second bus interface includes a system management bus interface.

Other embodiments can include a computing system having a motherboard with an expansion connector, a host device, a first bus coupled to the expansion connector and the host device, and a second bus coupled to the expansion connector and the host device. The computing system may also include an expansion card having one or more peripheral ports, a connection edge with a first bus interface and a second bus interface, and an IO controller coupled to the first bus interface and at least one of the one or more peripheral ports. The expansion card can also have an embedded controller coupled to the IO controller and the second bus interface, wherein the embedded controller includes logic to receive a GPIO signal from the IO controller. The logic may also notify the host device of the GPIO signal via the second bus interface, wherein the second bus includes a system management bus.

Additionally, embodiments may include a computer implemented method in which a GPIO signal is transferred from an IO controller of an expansion card to an embedded controller of the expansion card, wherein the GPIO signal includes at least one of a power management signal and a hot plug signal. The embedded controller can be used to translate the GPIO signal into a notification command, wherein the notification command may be issued to the host device via a system management bus interface. In one example, the notification command complies with a protocol associated with the system management bus interface and instructs the host device to issue a system management interrupt. The method may also provide for transferring data from the host device to the embedded controller via the system management bus interface, and using the embedded controller to generate one or more additional GPIO signals based on the data.

Embodiments may also include an apparatus having basic input output system (BIOS) logic to receive as host notify system management interrupt (SMI) associated with an input output (IO) controller on an expansion card. The logic can also configure a host system in response to the host notify SMI.

Turning now to FIG. 1, a computing system 10 is shown. The computing system 10 could be part of as platform such as a desktop personal computer (PC), server, workstation, etc., wherein the computing system 10 may have connectivity to one or more peripheral devices (not shown) such as a high definition (HD) image capture device, monitor, external graphics device, etc., via ports 12. In the illustrated example, the system 10 includes a motherboard 14 having a PCI-e (Peripheral Components Interconnect Express, e.g., PCI Express x16 Graphics 150W-ATX Specification 1.0, PCI Special Interest Group) compliant expansion connector 16, a host device 18, a first bus 20 coupled to the expansion connector 16 and the host device 18, and a second bus 22 (22a, 22b) coupled to the expansion connector 16 and the host device 18. The host device 18 may include, for example, a processor such as a central processing unit (CPU), platform controller hub (PCH) or other chipset component. In addition, the first bus 20 may include a PCI-e data lines, whereas the second bus 22 may include a system management bus (e.g., SMBus Specification, SBS Implementers Forum, Ver. 2.0, Aug. 3, 2000, etc.) in accordance with PCI-e standards. Thus, the first bus 20 might be configured to carry four lanes of data traffic (e.g., primary data transfer path), and the second bus 22 may include one or more SMBus data lines 22a to carry data as well as one or more SMBus clock lines 22b to carry a clock signal.

The illustrated computing system 10 also includes an expansion card 24 configured to be coupled to the expansion connector 16. In particular, the expansion card 24 may include a PCI-e compliant connection edge 26 having a set of contacts (not shown) that mate with a corresponding set of contacts (not shown) in the expansion connector 16 when the connection edge 26 is plugged into the expansion connector 16. Thus, the illustrated connection edge 26 has a first bus interface 28 corresponding to the first bus 20, and a second bus interface 30 corresponding to the second bus 22. The expansion card 24 may also include an input output (IO) controller 32 such as, for example, a Thunderbolt (e.g., Thunderbolt™ Technology: The Transformational PC I/O, 2011, Intel Corporation) controller coupled to the ports 12 and the first bus interface 28. Of particular note is that the IO controller 32 is mounted to the expansion card 24 rather than being soldered to the motherboard 14 as in conventional approaches. Accordingly, the illustrated configuration facilitates the addition of the functionality of the IO controller 32 to pre-existing systems without modifying the trace routing of the motherboard 14, or repurposing the pins in expansion connector 16 that are used for the first bus 20.

In order to enable communication between the IO controller 32 and the host device without modifying the expansion connector 16, the illustrated expansion card 24 also includes an embedded controller 34 that is able to translate signals from the IO controller 32 into signals that are compatible with the expansion connector 16. In this regard, the second bus 22 may be traditionally limited to the transfer of commands from the host device 18 to the expansion card 24. The IO controller 32, on the other hand, may be configured to transmit sideband general purpose IO (GPIO) signals such as hot plug signals (e.g., indicating the connection of a new peripheral device), power management signals, and so forth, to the host device 18.

Rather than using a dedicated link between the IO controller 32 and the host device 18 (as in the case of a conventional down device configuration), the illustrated configuration uses the embedded controller 34 to translate the GPIO signals from the IO controller 32 into notification commands that are compatible with a protocol associated with the second bus 22. Thus, in the case of a system management bus being used for the second bus 22, the translation might be conducted based on an SMBus protocol. As will be discussed in greater detail, the notification commands may be issued either in response to receiving GPIO signals from the IO controller 32 or in response to one or more polling commands from the host device 18.

In particular, the notification commands may be issued on the second bus 22 and may instruct the host device 18 to issue system management interrupts (SMIs) to a BIOS (basic input output system, not shown) of the computing system 10, wherein the BIOS may in turn invoke the appropriate handler routines to service the interrupts. For example, if the GPIO signal is as hot plug signal, the embedded controller 34 might issue a CIO (controller input output) wake notification on the second bus 22, which can instruct the host device 18 to issue an SMI to the BIOS. The BIOS may then invoke a hot plug handler to enable set-up of the newly connected peripheral device, wherein the set-up could involve the initialization and loading of as driver for the newly connected peripheral device. As will be discussed in greater detail, the embedded controller 34 may also be used to issue GPIO signals to the IO controller 32 based on data from the host device 18. Example instances of such host-to-card communications might include power management messages, configuration messages, and so forth.

FIG. 2A shows a method 36 of transferring information from an expansion card to a host device. The method 36 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 36 may be written in any combination of one or more programming languages, including an object oriented programming language such as C++ or the like and conventional procedural programming languages, such as the "C" programming language or similar programming languages. Moreover, the method 36 could be implemented in an embedded controller such as the controller 34 (FIG. 1) using any of the aforementioned circuit technologies.

Illustrated processing block 38 provides for receiving a GPIO signal from an expansion card IO controller such as a Thunderbolt controller, wherein the GPIO signal could include, for example, a power management signal, hot plug signal (e.g., hot plug pin toggle), and so forth. An off-card host device may be notified of the GPIO signal at block 40 via a bus such as a system management bus. In particular, the host device could periodically poll the expansion card over the system management bus for updates as to the status of the IO controller, wherein the notification is issued in response to one or more of the polling commands. Alternatively, the notification may be in the form of a "host notify" command that is issued to the system management bus in response to receiving the GPIO signal from the IO controller, wherein the host notify approach may be more power efficient than the polling approach. Upon receiving the notification command at block 42, the host device may issue an SMI to BIOS at block 44 in order to enable processing of the status update with regard to the IO controller.

FIG. 3 shows a method 35 of conducting a BIOS routine. Processing block 37 may provide for receiving a host notify SMI associated with an IO controller on an expansion card. Block 39 can configure a host system in response to the host notify SMI. As already noted, the configuration at block 39 could involve invoking a hot plug handler, initializing a driver corresponding to a peripheral device coupled to the expansion card, and so forth. Thus, in the case of a hot plug event, a peripheral device may be added to the system without the need to reboot the system.

Turning now to FIG. 2B, a method 46 of transferring information from a host device to an expansion card is shown. For example, the method 46 could be used to set the low power state of an IO controller such as a Thunderbolt controller on an expansion card, read a hot plug status of the IO controller, and so forth. The method 46 may be implemented as a set of logic instructions stored in a machine- or computer-readable storage medium such as RAM, ROM, PROM, flash memory, etc., in configurable logic such as PLAs, FPGAs, CPLDs, in fixed-functionality logic hardware using circuit technology such as ASIC, CMOS or TTL technology, or any combination thereof. Illustrated processing block 48 provides for making a function call from the host device to BIOS, wherein the function call may be associated with the generation of data to be transmitted to a peripheral device. The data might be used to obtain status information for a peripheral device or to configure a newly connected peripheral device for communication with the host device. In response to the function call from the host device, the BIOS may perform certain activities such as initializing drivers, establishing configuration settings, and so forth, wherein block 50 can send the data from the host device to an embedded controller on the expansion card via a system management bus interface. The embedded controller receives the data from the host device 52, and generates one or more GPIO signals at block 54 based on the data. As already noted, the generated GPIO signals may be sent to the Thunderbolt controller.

Thus, techniques described herein may facilitate the addition of IO controller functionality to pre-existing systems without modifying motherboard trace routing, or repurposing the primary data pins in the expansion connector. In particular, techniques can enable any system that follows PCI-e SMBus routing to support Thunderbolt functionality with only the addition of an expansion card and potentially as BIOS update.

Embodiments of the present invention are applicable for use with all types of semiconductor integrated circuit ("IC") chips. Examples or these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A computer implemented method comprising:
   transferring a general purpose input output (GPIO) signal from an input output (IO) controller of a PCI-e compliant expansion card to an embedded controller of the expansion card, wherein the GPIO signal includes at least one of a power management signal and a hot plug signal;
   using the embedded controller to translate the GPIO signal into a notification command;
   issuing the notification command to a host device via a system management bus interface, wherein the notification command complies with a protocol associated with the system management bus interface and instructs the host device to issue a system management interrupt;
   transferring data from the host device to the embedded controller via the system management bus interface; and
   using the embedded controller to generate one or more additional GPIO signals based on the data.

2. The method of claim 1, wherein the notification command is issued to the host device in response to receiving the GPIO signal.

3. The method of claim 1, further including transferring a polling command from the host device to the embedded controller via the system management bus interface, wherein the notification command is issued to the host device in response to the polling command.

4. The method of claim 1, wherein the GPIO signal is transferred from a Thunderbolt controller to the embedded controller.

5. A non-transitory computer readable storage medium comprising a set of instructions which, if executed by a processor, cause a system to:
   receive a general purpose input output (GPIO) signal from an input output (IO) controller of an expansion card; and
   notify an off-card host device of the GPIO signal via a system management bus interface of the expansion card.

6. The non-transitory medium of claim 5, wherein the instructions, if executed, cause a system to:
   translate the GPIO signal into a notification command based on a protocol associated with the system management bus; and
   issue the notification command to the host device via the system management bus interface.

7. The non-transitory medium of claim 6, wherein the notification command is to be issued to the host device in response to receiving the GPIO signal.

8. The non-transitory medium of claim 6, wherein the instructions, if executed, cause a system to receive a polling command from the host device via the system management bus interface, and wherein the notification command is to be issued to the host device in response to the polling command.

9. The non-transitory medium of claim 6, wherein the notification command is to instruct the host device to issue a system management interrupt.

10. The non-transitory medium of claim 5, wherein the instructions, if executed, cause a system to:
    receive data from the host device via the system management bus interface; and
    generate one or more additional GPIO signals based on the data.

11. The non-transitory medium of claim 5, wherein at least one of a power management signal and a hot plug signal are to be received from the IO controller.

12. The non-transitory medium of claim 5, wherein the GPIO signal is to be received from a Thunderbolt controller.

13. A system comprising:
a motherboard including an expansion connector, a host device, a first bus coupled to the expansion connector and the host device, and a second bus coupled to the expansion connector and the host device; and
an expansion card including one or more peripheral ports, a connection edge having a first bus interface and a second bus interface, an input output (IO) controller coupled to the first bus interface and at least one of the one or more peripheral ports, and an embedded controller coupled to the IO controller and the second bus interface, wherein the embedded controller has logic to,
receive a general purpose input output (GPIO) signal from the IO controller, and
notify the host device of the GPIO signal via the second bus interface, wherein the second bus includes a system management bus.

14. The system of claim 13, wherein the logic is to,
translate the GPIO signal into a notification command based on a protocol associated with the system management bus, and
issue the notification command to the host device via the system management bus.

15. The system of claim 14, wherein the notification command is to be issued to the host device in response to receiving the GPIO signal.

16. The system of claim 14, wherein the host device is to issue a polling command to the embedded controller and the notification command is to be issued to the host device in response to receiving the polling command.

17. The system of claim 14, wherein the notification command is to instruct the host device to issue a system management interrupt.

18. The system of claim 13, wherein the logic is to,
receive data from the host device via the system management bus, and
generate one or more additional GPIO signals based on the data.

19. The system of claim 13, wherein at least one of a power management signal and a hot plug signal are to be received from the IO controller.

20. The system of claim 13, wherein the IO controller includes a Thunderbolt controller.

21. The system of claim 13, wherein the expansion connector includes a PCI-e connector having a PCI-e bus interface, and the connection edge of the expansion card is a PCI-e compliant connection edge.

22. An expansion card comprising:
one or more peripheral ports;
a connection edge including a first bus interface and a second bus interface;
an input output (IO) controller coupled to the first bus interface and at least one of the one or more peripheral ports; and
an embedded controller coupled to the IO controller and the second bus interface, wherein the embedded controller has logic to,
receive a general purpose input output (GPIO) signal from the IO controller, and
notify an off-card host device of the GPIO signal via the second bus interface, wherein the second bus interface includes a system management bus interface.

23. The expansion card of claim 22, wherein the logic is to,
translate the GPIO signal into a notification command based on a protocol associated with the system management bus, and
issue the notification command to the host device via the system management bus.

24. The expansion card of claim 23, wherein the notification command is to be issued to the host device in response to receiving the GPIO signal.

25. The expansion card of claim 23, wherein the logic is to receive a polling command from the host device via the system management bus, and wherein the notification command is to be issued to the host device in response to receiving the polling command.

* * * * *